US011942737B2

(12) United States Patent
Kobayashi et al.

(10) Patent No.: US 11,942,737 B2
(45) Date of Patent: Mar. 26, 2024

(54) JOINT CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroki Kobayashi, Mie (JP); Hajime Kawase, Mie (JP); Masaaki Tabata, Mie (JP); Teruo Hara, Mie (JP); Hajime Matsui, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 365 days.

(21) Appl. No.: 17/598,477

(22) PCT Filed: Mar. 24, 2020

(86) PCT No.: PCT/JP2020/012899

§ 371 (c)(1),
(2) Date: Sep. 27, 2021

(87) PCT Pub. No.: WO2020/196480

PCT Pub. Date: Oct. 1, 2020

(65) Prior Publication Data

US 2022/0190534 A1 Jun. 16, 2022

(30) Foreign Application Priority Data

Mar. 28, 2019 (JP) ................................ 2019-063732

(51) Int. Cl.

*H01R 31/08* (2006.01)
*H01R 4/28* (2006.01)

(Continued)

(52) U.S. Cl.

CPC ............... *H01R 31/08* (2013.01); *H01R 4/28* (2013.01); *H01R 13/42* (2013.01); *H01R 13/629* (2013.01)

(58) Field of Classification Search

CPC .......... H01R 31/08; H01R 4/28; H01R 13/42; H01R 13/629; H01R 4/5083; H01R 13/4361; H01R 13/502; H01R 31/085

See application file for complete search history.

(56) References Cited

U.S. PATENT DOCUMENTS

| | | | | |
|---|---|---|---|---|
| 6,354,864 B1 * | 3/2002 | Kusumoto | ........... | H01R 31/085 439/402 |
| 10,944,187 B2 * | 3/2021 | Takeuchi | ............... | H01R 4/188 |
| 2019/0252803 A1 | 8/2019 | Takeuchi et al. | | |

FOREIGN PATENT DOCUMENTS

| | | |
|---|---|---|
| JP | S15-000085 Y1 | 1/1940 |
| JP | 2001-006788 A | 1/2001 |

(Continued)

OTHER PUBLICATIONS

International Search Report dated Jun. 9, 2020 for WO 2020/196480 A1 (6 pages).

*Primary Examiner* — Briggitte R. Hammond
(74) *Attorney, Agent, or Firm* — Venjuris, P.C.

(57) ABSTRACT

A joint connector for connecting a plurality of wires includes a lower housing, an upper cover assembled with the lower housing, a plurality of terminals respectively connected to front end parts in an extending direction of the plurality of wires, and a busbar connected to the plurality of terminals. The busbar disposed in the lower housing includes a plurality of tabs. Each of the plurality of terminals disposed in the lower housing includes a tube portion, each of the plurality of tabs being inserted into the tube portion, sandwiching portions extending along the extending direction and configured to sandwich one of the plurality of wires, and a sliding portion disposed outside the sandwiching portions, movable along the extending direction and including pressurizing portions configured to pressurize the sandwiching portions toward the wire with the one of the plurality of wires sandwiched by the sandwiching portions.

4 Claims, 13 Drawing Sheets

(51) Int. Cl.
*H01R 13/42* (2006.01)
*H01R 13/629* (2006.01)

(56) References Cited

FOREIGN PATENT DOCUMENTS

| | | | |
|---|---|---|---|
| JP | 2005-129447 | A | 5/2005 |
| JP | 2012-099248 | A | 5/2012 |
| JP | 2013-247057 | A | 12/2013 |
| JP | 2019-096426 | A | 6/2019 |
| WO | 2019/159714 | A1 | 8/2019 |
| WO | 2019/159730 | A1 | 8/2019 |
| WO | 2019/159746 | A1 | 8/2019 |
| WO | 2019/225462 | A1 | 11/2019 |
| WO | 2019/235389 | A1 | 12/2019 |

* cited by examiner

JOINT CONNECTOR

CROSS REFERENCE TO RELATED APPLICATIONS

This application is a national phase of PCT application No. PCT/JP2020/012899, filed on 24 Mar. 2020, which claims priority from Japanese patent application No. 2019-063732, filed on 28 Mar. 2019, all of which are incorporated herein by reference.

TECHNICAL FIELD

The present disclosure relates to a joint connector.

BACKGROUND

A joint connector is known from Japanese Patent Laid-Open Publication No. 2012-099248. The joint connector includes a housing and a busbar. The housing is provided with a plurality of cavities and a busbar accommodating portion communicating with the plurality of cavities and formed with an opening on a side opposite to these cavities. The busbar is provided with a body portion accommodated in the busbar accommodating portion and a plurality of male terminal portions extending from the body portion and to be electrically connected to female terminals. The female terminals are respectively crimped to ends of a plurality of wires.

PRIOR ART DOCUMENT

Patent Document

Patent Document 1: JP 2012-099248 A

SUMMARY OF THE INVENTION

Problems to be Solved

According to the above technique, since relatively large-scale facilities such as a mold and a jig for crimping the female terminals to the wires are necessary, equipment investment is necessary, which causes a problem of increasing manufacturing cost.

The present disclosure was completed on the basis of the above situation and aims to provide a joint connector reduced in manufacturing cost.

Means to Solve the Problem

The present disclosure is directed to a joint connector for connecting a plurality of wires, the joint connector including a lower housing, an upper cover assembled with the lower housing, a plurality of terminals respectively connected to front end parts in an extending direction of the plurality of wires, and a busbar connected to the plurality of terminals, wherein the busbar disposed in the lower housing includes a plurality of tabs, each of the plurality of terminals disposed in the lower housing includes a tube portion, each of the plurality of tabs being inserted into the tube portion, a sandwiching portion extending along the extending direction and configured to sandwich one of the plurality of wires, and a sliding portion disposed outside the sandwiching portion, movable along the extending direction and including a pressurizing portion configured to pressurize the sandwiching portion toward the wire with the one of the plurality of wires sandwiched by the sandwiching portion, and a terminal holding portion projecting downward from the upper cover is engaged with the terminals.

Effect of the Invention

According to the present disclosure, the manufacturing cost of the joint connector can be reduced.

DETAILED DESCRIPTION TO EXECUTE THE INVENTION

Description of Embodiments of Present Disclosure

Figure 1:
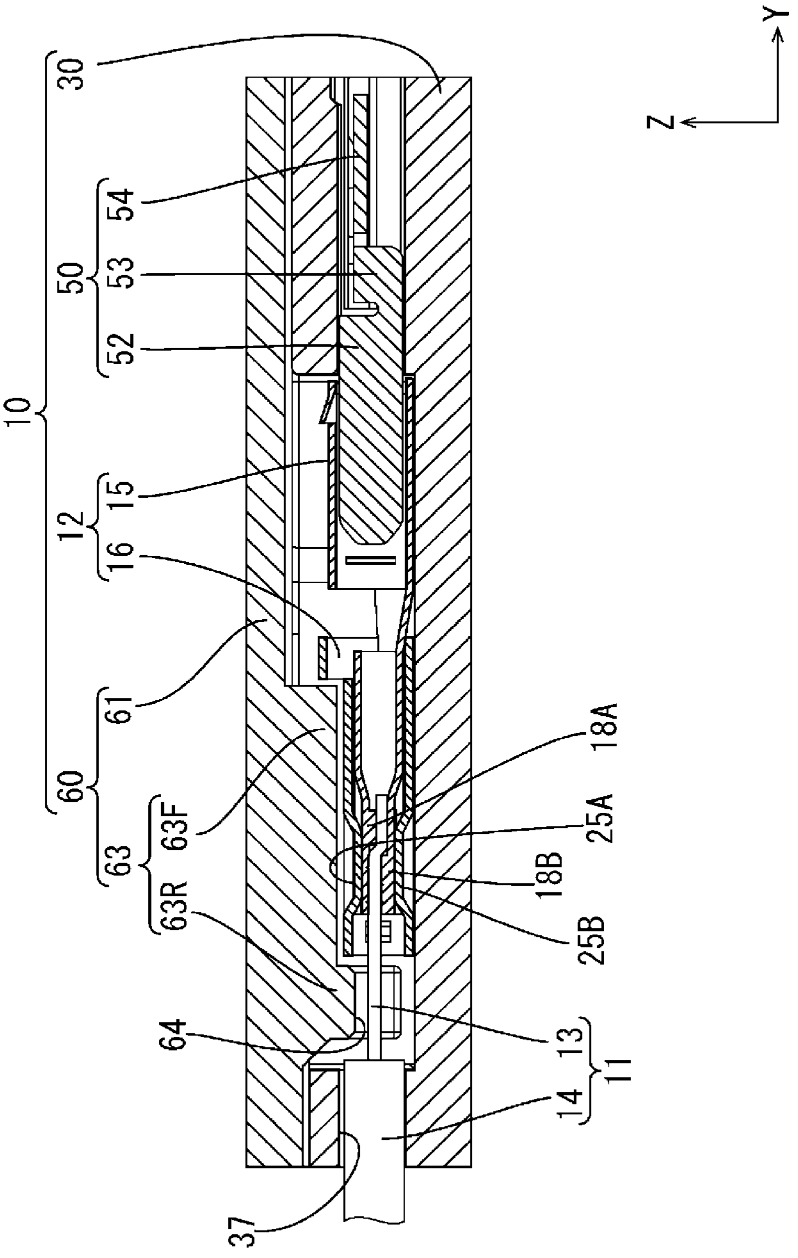
FIG. 1 is a section showing a joint connector according to one embodiment.

First, embodiments of the present disclosure are listed and described.

(1) The present disclosure relates to a joint connector for connecting a plurality of wires, the joint connector including a lower housing, an upper cover assembled with the lower housing, a plurality of terminals respectively connected to front end parts in an extending direction of the plurality of wires, and a busbar connected to the plurality of terminals, wherein the busbar disposed in the lower housing includes a plurality of tabs, each of the plurality of terminals disposed in the lower housing includes a tube portion, each of the plurality of tabs being inserted into the tube portion, a sandwiching portion extending along the extending direction and configured to sandwich one of the plurality of wires, and a sliding portion disposed outside the sandwiching portion, movable along the extending direction and including a pressurizing portion configured to pressurize the sandwiching portion toward the wire with the one of the plurality of wires sandwiched by the sandwiching portion, and a terminal holding portion projecting downward from the upper cover is engaged with the terminals.

According to the present disclosure, a core of the wire and the terminal can be electrically connected without using a relatively large-scale jig by pushing the sliding portion forward with a relatively small jig. In this way, the manufacturing cost of the joint connector can be reduced.

Further, by applying the terminals according to the present disclosure to the joint connector, the manufacturing cost of the joint connector can be reduced.

According to the present disclosure, the terminals can be retained and held in the lower housing not to come out upward by inserting the busbar into the tube portions. Since a structure for retaining and holding the terminals becomes unnecessary in this way, the structure of the joint connector can be simplified. As a result, the manufacturing cost of the joint connector can be reduced.

(2) Preferably, the sliding portion is movable with respect to the sandwiching portion between a partial locking position where the pressurizing portion is separated from the sandwiching portion and a full locking position where the pressurizing portion presses the sandwiching portion toward the wire, and the terminal holding portion is engaged with the sliding portions located at the full locking position with respect to the sandwiching portions.

By assembling the upper cover with the lower housing, the terminal holding portion provided on the upper cover is locked to the sliding portions, wherefore movements of the sliding portions to the full locking position can be confirmed.

(3) Preferably, the lower housing includes a rear wall located behind the plurality of terminals in the extending direction, and the rear wall includes a plurality of wire insertion holes penetrating in the extending direction, the plurality of wires being respectively inserted through the wire insertion holes, and the sandwiching portions are disposed in front of the wire insertion holes in the extending direction.

If the wire is inserted from behind the wire insertion hole, the wire moves toward the sandwiching portion located in front of the wire insertion hole. Since the wire is guided to the sandwiching portion by the wire insertion hole, the manufacturing efficiency of the joint connector can be improved.

(4) Preferably, a cross-sectional area of the wire insertion hole orthogonal to the extending direction is smaller than that of the sliding portion orthogonal to the extending direction.

Since the cross-sectional area of the wire insertion hole is smaller than that of the sliding portion, the escape of the sliding portion to the outside of the lower housing through the wire insertion hole is suppressed. In this way, the terminal having the sliding portion held at the partial locking position can be held in the lower housing.

Details of Embodiment of Present Disclosure

Hereinafter, an embodiment of the present disclosure is described. The present invention is not limited to these illustrations and is intended to be represented by claims and include all changes in the scope of claims and in the meaning and scope of equivalents.

Embodiment

One embodiment of the present disclosure is described with reference to FIGS. 1 to 13. A joint connector 10 according to this embodiment electrically connects a plurality of wires 11. In the following description, a direction indicated by an arrow Z is referred to as an upward direction, a direction indicated by an arrow Y is referred to as a forward direction, and a direction indicated by an arrow X is referred to as a leftward direction. Note that, for a plurality of identical members, only some members may be denoted by a reference sign and the other members may not be denoted by the reference sign.

As shown in FIG. 1, the joint connector 10 according to this embodiment includes a plurality of terminals 12 to be respectively connected to front end parts in an extending direction (direction indicated by the arrow Y) of the plurality of wires 11, a busbar 50 to be connected to the plurality of terminals 12, a lower housing 30 for accommodating the plurality of terminals 12 and the busbar 50 inside and an upper cover 60 to be mounted on an upper part of the lower housing 30.

[Wires 11]

As shown in FIG. 1, the plurality of wires 11 are disposed to extend in a front-rear direction (an example of the extending direction). The wire 11 is such that the outer periphery of a core 13 is surrounded by an insulation coating 14 made of insulating synthetic resin. The core 13 according to this embodiment is composed of one metal wire. Note that the core 13 may be a stranded wire formed by twisting a plurality of metal thin wires. An arbitrary metal such as copper, copper alloy, aluminum or aluminum alloy can be appropriately selected as a metal constituting the core 13 if necessary. The core 13 according to this embodiment is made of copper or copper alloy.

[Lower Housing 30]

Figure 2:
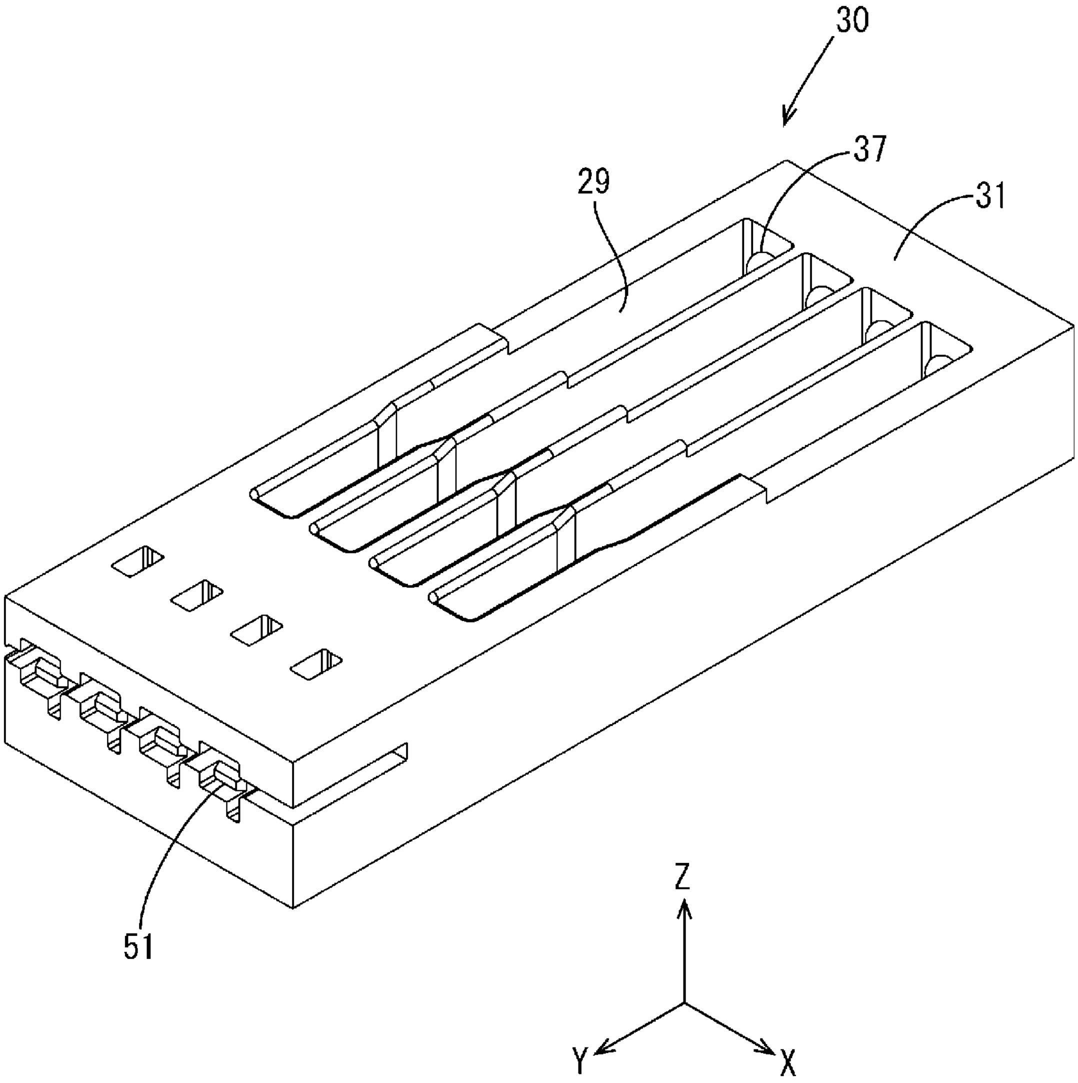
FIG. 2 is a perspective view showing a lower housing.

As shown in FIG. 2, the lower housing 30 is in the form of a rectangular parallelepiped flat in a vertical direction. The lower housing 30 is formed by injection-molding a material containing an insulating synthetic resin. A plurality of (four in this embodiment) cavities 29 extending in the front-rear direction are arranged in a lateral direction in the lower housing 30. The cavities 29 are open upward and the terminals 12 are inserted into the cavities 29 from above.

As shown in FIGS. 1 and 2, the cavities 29 are open forward in a front end part of the lower housing 30 and these openings serve as busbar insertion holes 51 through which the busbar 50 is inserted into the cavities 29 from front.

A plurality of (four in this embodiment) wire insertion holes 37 into which the wires 11 are inserted as shown in FIG. 1 are provided side by side in the lateral direction to penetrate through a rear wall 31 of the lower housing 30 in the front-rear direction. The wire insertion holes 37 are provided at positions corresponding to the cavities 29 of the lower housing 30. An inner diameter of the wire insertion hole 37 is set to be equal to or somewhat larger than an outer diameter of the insulation coating 14 of the wire 11.

[Upper Cover 60]

As shown in FIG. 1, the upper part of the lower housing 30 is covered by the upper cover 60 assembled from above. Although not shown in detail, the lower housing 30 and the upper cover 60 are integrally assembled by a known locking structure. The upper cover 60 is formed by injection-molding an insulating synthetic resin.

Figure 3:
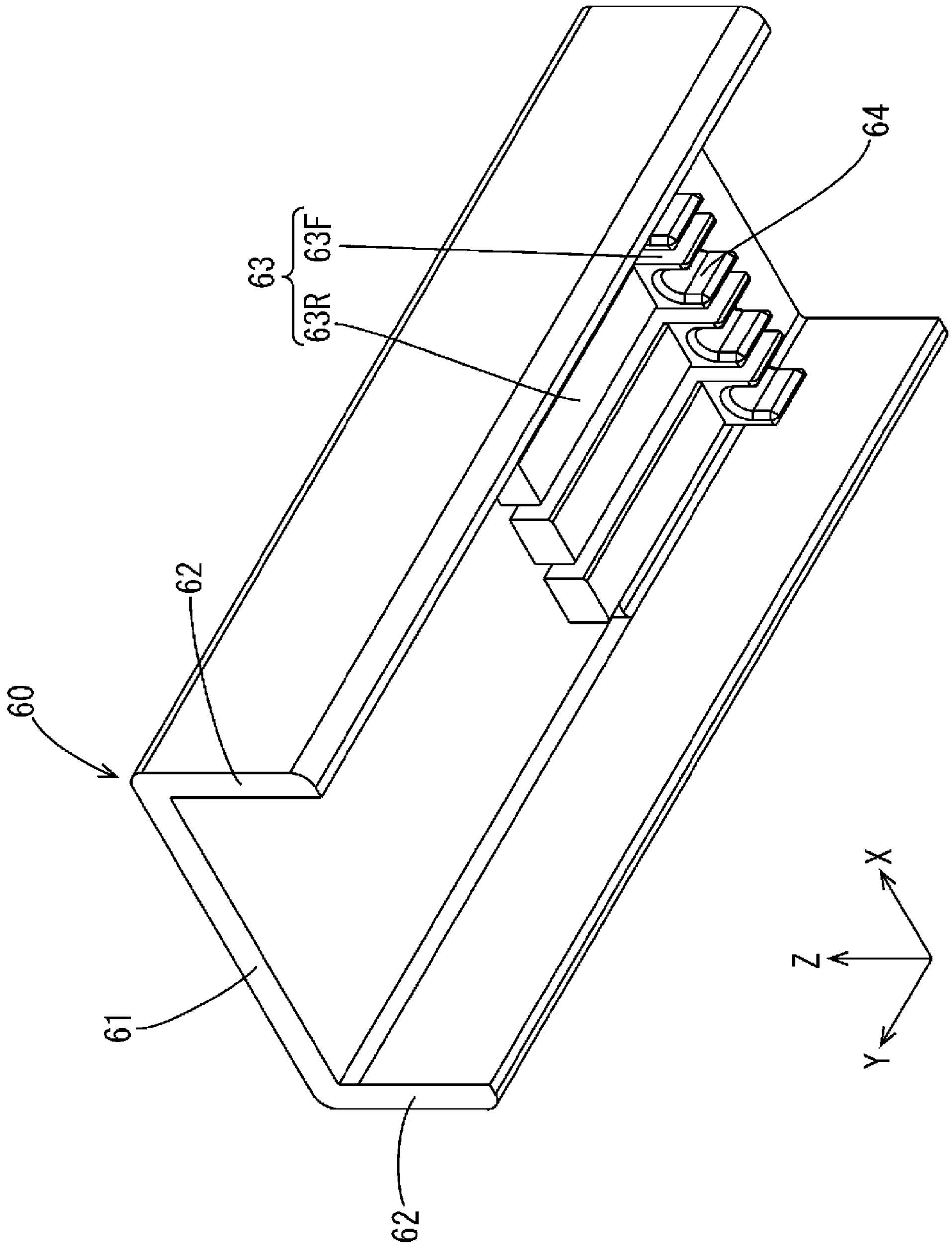
FIG. 3 is a perspective view showing an upper cover.

As shown in FIG. 3, the upper cover 60 includes an upper wall 61 and two side walls 62 extending downward from both left and right sides of the upper wall 61. A plurality of (four in this embodiment) terminal holding portions 63 projecting downward extend in the front-rear direction on the lower surface of the upper wall 61. The terminal holding portion 63 includes a front terminal holding portion 63F located on a front side and a rear terminal holding portion 63R located behind the front terminal holding portion 63F. The rear terminal holding portion 63R projects further downward than the front terminal holding portion 63F. An arcuate groove 64 is formed in the lower surface of the rear terminal holding portion 63R. The inner shape of the groove 64 is the same as or somewhat larger than the outer shape of the wire 11. By disposing the wire 11 in the groove 64, the wire 11 is held in the cavity 29 while extending in the front-rear direction.

[Busbar 50]

Figure 4:
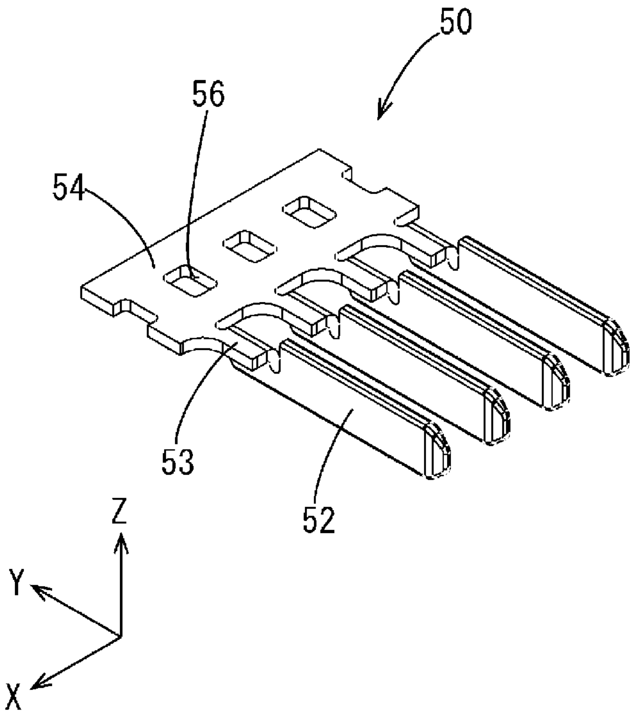
FIG. 4 is a perspective view showing a busbar.

As shown in FIG. 4, the busbar 50 is formed by press-working a metal plate material into a predetermined shape. An arbitrary metal such as copper or copper alloy can be appropriately selected as the metal plate material. The busbar 50 includes a plurality of (four in this embodiment) tabs 52 extending rearward and a coupling portion 54 coupling front end parts of the tabs 52 via relay portions 53. The tab 52 is in the form of a plate flat in the lateral direction. The coupling portion 54 is in the form of a plate flat in the vertical direction. The relay portions 53 are formed to extend rearward from the coupling portion 54. The right edge of the relay portion 53 is bent downward and connected to the tab 52.

Figure 10:
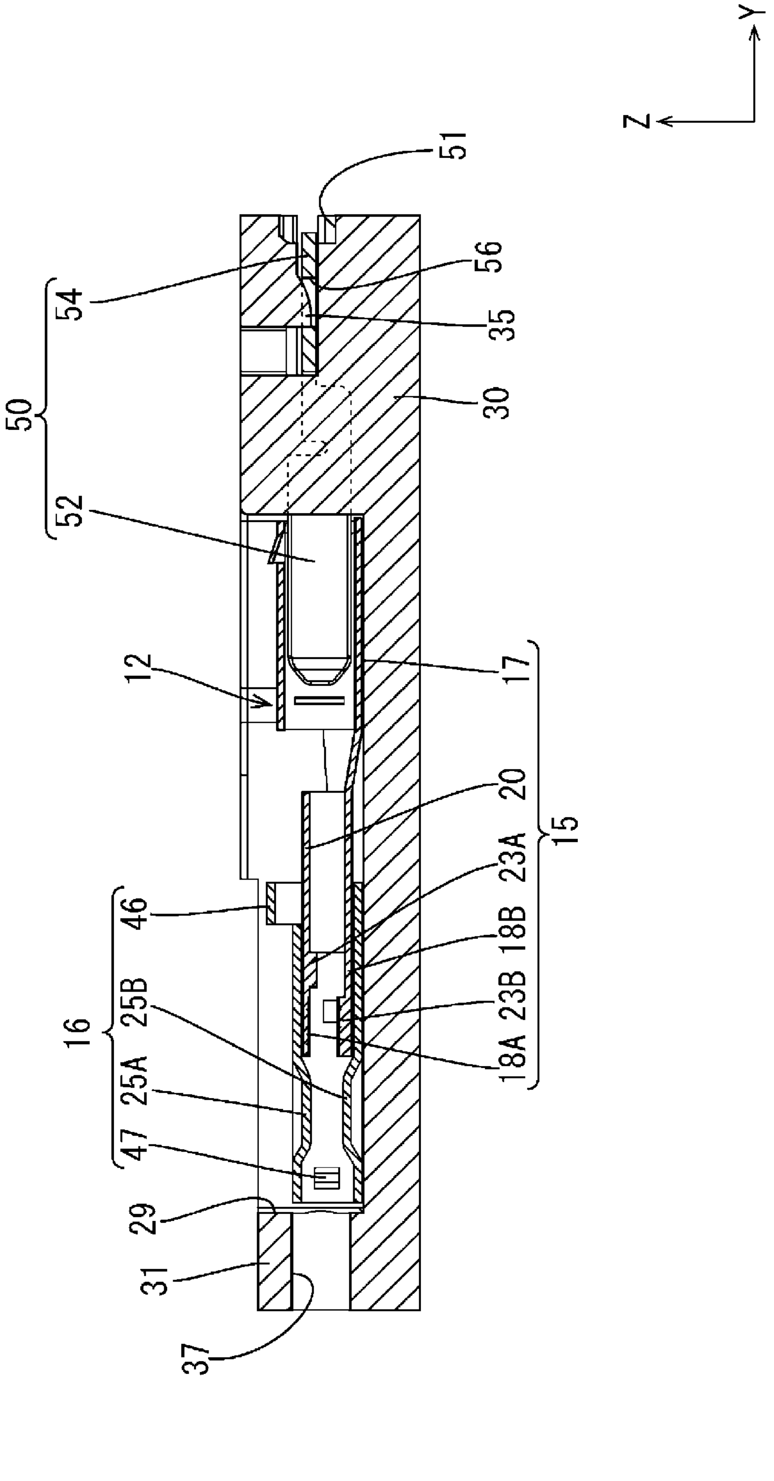
FIG. 10 is a section along X-X in FIG. 9.

As shown in FIG. 4, a plurality of (three in this embodiment) locking holes 56 arranged while being spaced apart in the lateral direction penetrate through the coupling portion 54. When viewed from above, the locking holes 56 have a rectangular shape. As shown in FIG. 10, with the busbar 50 inserted in the cavities 29, locking claws 35 projecting from the housing 30 toward the coupling portion 54 are accommodated in the respective locking holes 56. Front hole edge parts of the locking holes 56 contact the locking claws 35 from front, thereby suppressing a forward movement of the busbar 50.

[Terminals 12]

Figure 5:
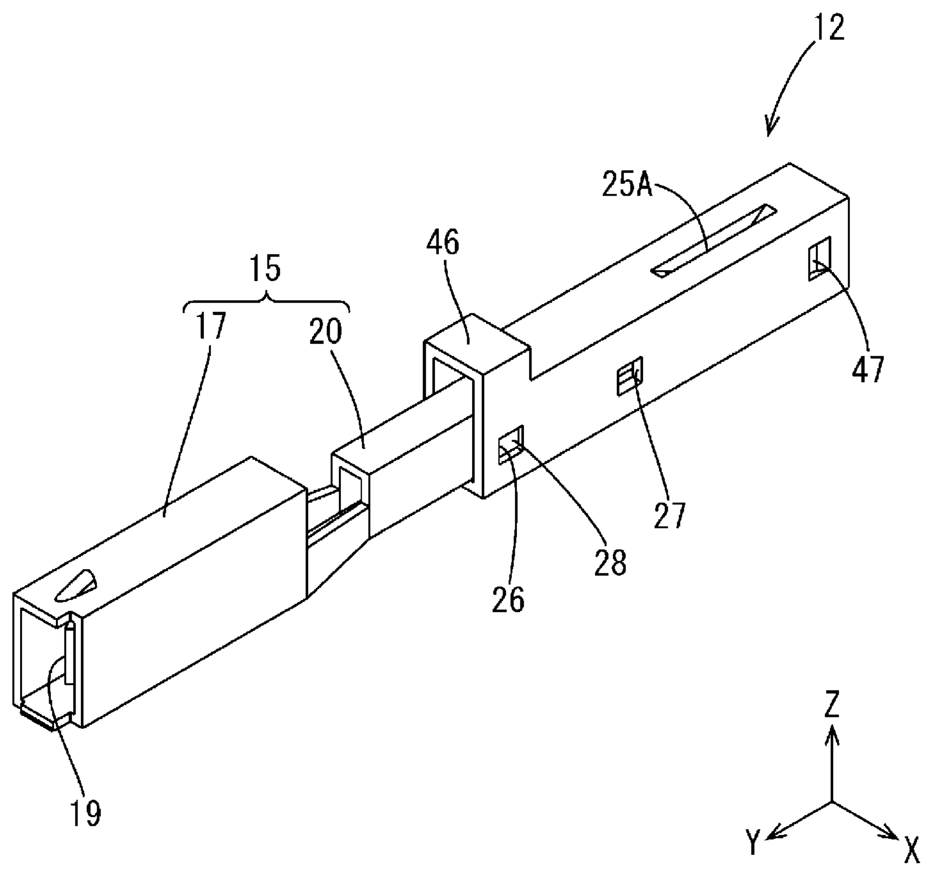
FIG. 5 is a perspective view showing a terminal having a sliding portion held at a partial locking position with respect to a terminal body.

As shown in FIG. 5, the terminal 12 includes a terminal body 15 made of metal and a sliding portion 16 relatively slidable with respect to the terminal body 15.

[Terminal Bodies 15]

The terminal body 15 is formed into a predetermined shape by a known method such as press-working, cutting or casting. An arbitrary metal such as copper, copper alloy, aluminum, aluminum alloy or stainless steel can be appropriately selected as a metal constituting the terminal body 15 if necessary. The terminal body 15 according to this embodiment is made of copper or copper alloy. A plating layer may be formed on the surface of the terminal body 15. An arbitrary metal such as tin, nickel or silver can be appropriately selected as a metal constituting the plating layer if necessary. Tin plating is applied to the terminal body 15 according to this embodiment.

As shown in FIG. 5, the terminal body 15 includes a tube portion 17, into which the tab 52 is insertable, and a wire connecting portion 20 located behind the tube portion 17 and to be connected to the wire 11. The wire connecting portion 20 includes an upper sandwiching portion 18A and a lower sandwiching portion 18B extending rearward.

As shown in FIG. 5, the tube portion 17 is in the form of a rectangular tube extending in the front-rear direction. The front end of the tube portion 17 is open so that the tab 52 is insertable.

Figure 6:
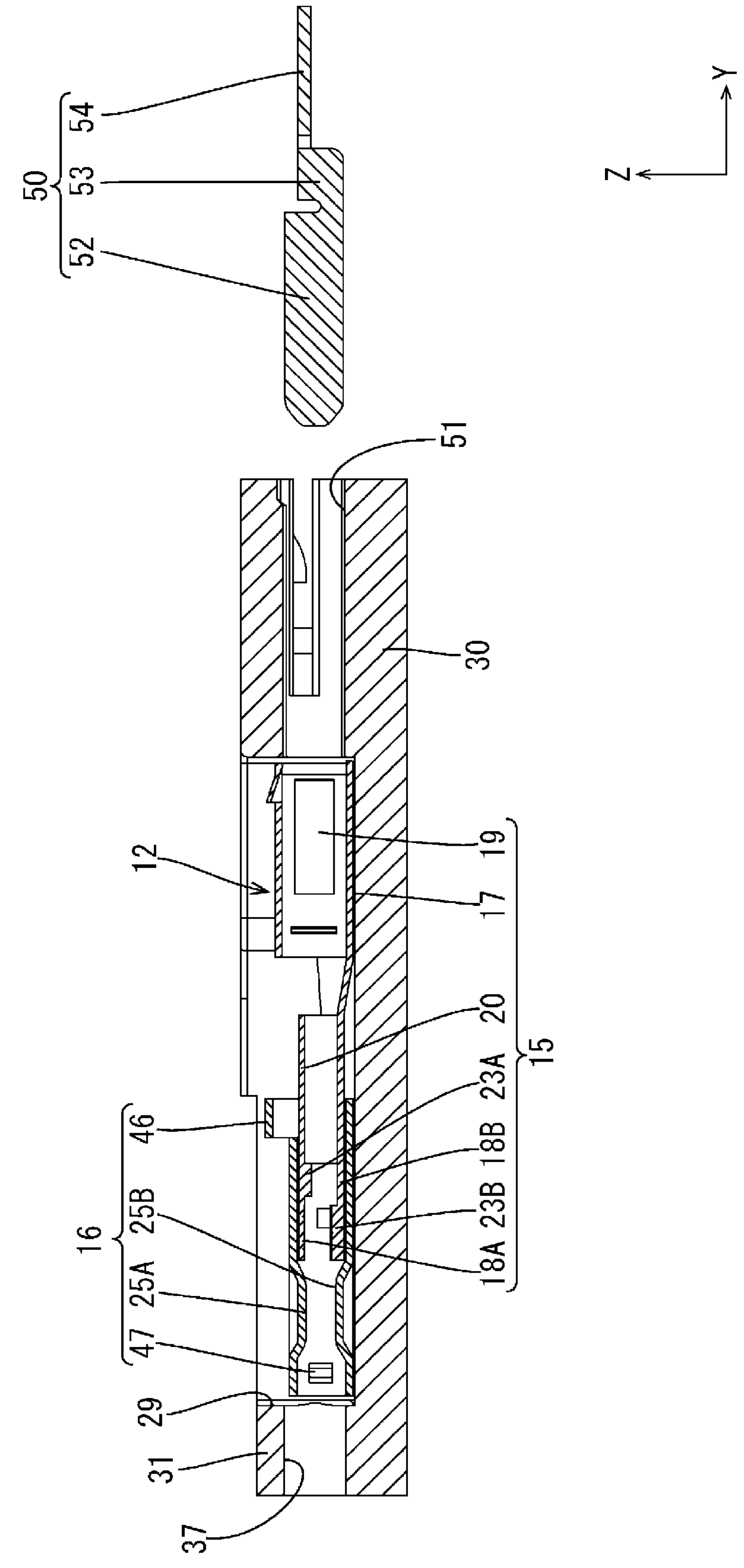
FIG. 6 is a section along VI-VI in FIG. 8.

As shown in FIG. 6, a resiliently deformable resilient contact piece 19 is disposed inside the tube portion 17. The resilient contact piece 19 extends inward from the inner wall of the tube portion 17. The tab 52 inserted into the tube portion 17 presses and resiliently deforms the resilient contact piece 19. The tab 52 is sandwiched between the inner wall of the tube portion 17 and the resilient contact piece 19 by a resilient force of the resiliently deformed resilient contact piece 19. In this way, the tab 52 and the terminal 12 are electrically connected.

As shown in FIG. 6, the wire connecting portion 20 in the form of a rectangular tube is provided behind the tube portion 17. The upper sandwiching portion 18A (an example of a sandwiching portion) is provided to extend rearward on a rear end part of the upper wall of the wire connecting portion 20, and the lower sandwiching portion 18B (an example of the sandwiching portion) is provided to extend rearward on a rear end part of the lower wall of the wire connecting portion 20. The upper and lower sandwiching portions 18A, 18B have a shape elongated in the front-rear direction. Lengths in the front-rear direction of the upper and lower sandwiching portions 18A, 18B are substantially equal.

An upper holding protrusion 23A projecting downward is provided at a position forward of a rear end part on the lower surface of the upper sandwiching portion 18A. A lower holding protrusion 23B projecting upward is provided on a rear end part on the upper surface of the lower sandwiching portion 18B. The lower and upper holding protrusions 23B, 23A are provided at positions shifted in the front-rear direction.

The lower surface of the upper sandwiching portion 18A and the upper surface of the lower sandwiching portion 18B bite into an oxide film formed on the surface of the core 13 to peel off the oxide film, thereby exposing the metal surface of the core 13. By the contact of this metal surface and the upper and lower sandwiching portions 18A, 18B, the core 13 and the terminal body 15 are electrically connected.

[Sliding Portions 16]

As shown in FIG. 5, the sliding portion 16 is in the form of a rectangular tube extending in the front-rear direction. The sliding portion 16 is formed into a predetermined shape by a known method such as cutting, casting or press-working. An arbitrary metal such as copper, copper alloy, aluminum, aluminum alloy or stainless steel can be appropriately selected as a metal constituting the sliding portion 16 if necessary. Although not particularly limited, the sliding portion 16 according to this embodiment is made of stainless steel. A plating layer may be formed on the surface of the sliding portion 16. An arbitrary metal such as tin, nickel or silver can be appropriately selected as a metal constituting the plating layer if necessary.

A cross-sectional shape of the sliding portion 16 is the same as or somewhat larger than that of a region of the terminal body 15 where the upper and lower sandwiching portions 18A, 18B are provided. In this way, the sliding portion 16 is disposed outside the region of the terminal body 15 where the upper and lower sandwiching portions 18A, 18B are provided.

A cross-sectional area of the wire insertion hole 37 orthogonal to the front-rear direction is smaller than that of the sliding portion 16 orthogonal to the front-rear direction. In this way, the sliding portion 16 cannot pass through the wire insertion hole 37 in the front-rear direction.

As shown in FIG. 6, an upper pressurizing portion 25A (an example of a pressurizing portion) projecting downward is provided on the lower surface of the upper wall of the sliding portion 16. A lower pressurizing portion 25B (an example of the pressurizing portion) projecting upward is provided on the upper surface of the lower wall of the sliding portion 16.

As shown in FIG. 5, a partial lock receiving portion 26 is open at a position near a front end part in the front-rear direction in a side wall of the sliding portion 16. Further, a full lock receiving portion 27 is open at a position behind the partial lock receiving portion 26 in the side wall of the sliding portion 16. The partial lock receiving portion 26 and the full lock receiving portion 27 are resiliently lockable to a locking projection 28 provided on a side wall of the terminal body 15.

Figure 12:
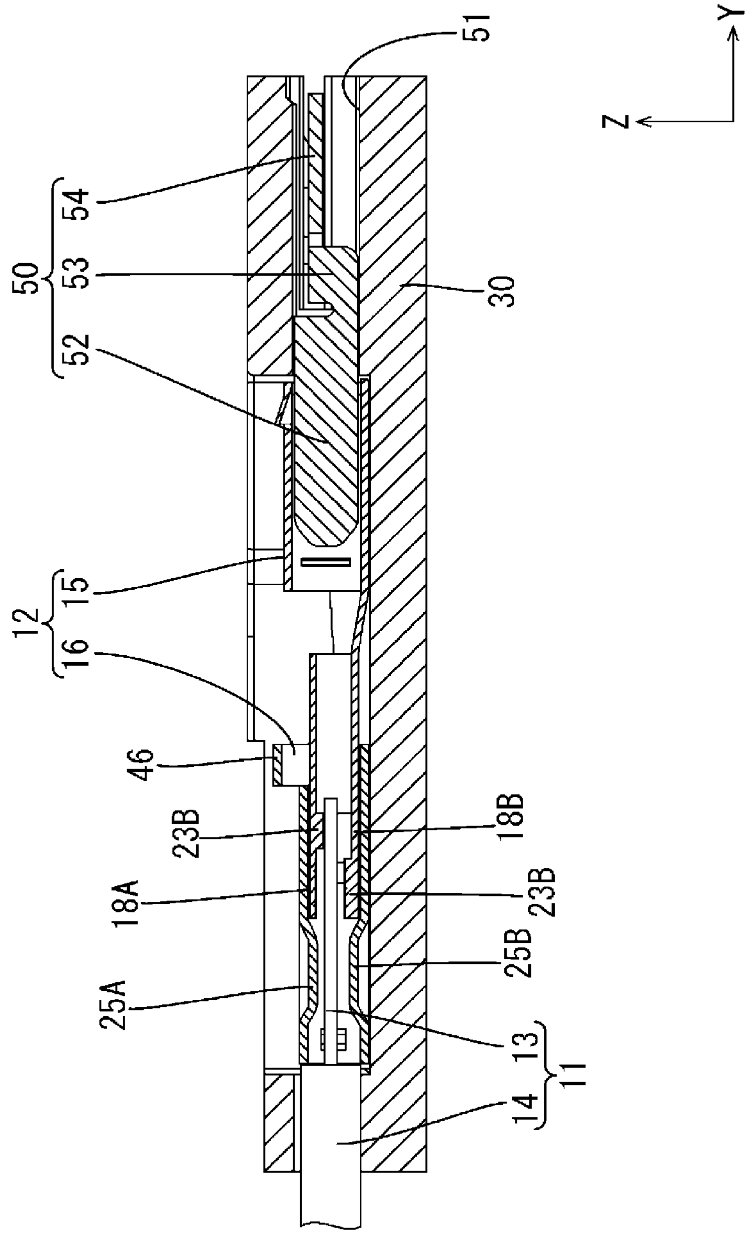
FIG. 12 is a section showing a state where a wire is inserted in the lower housing and the terminal.
Figure 13:
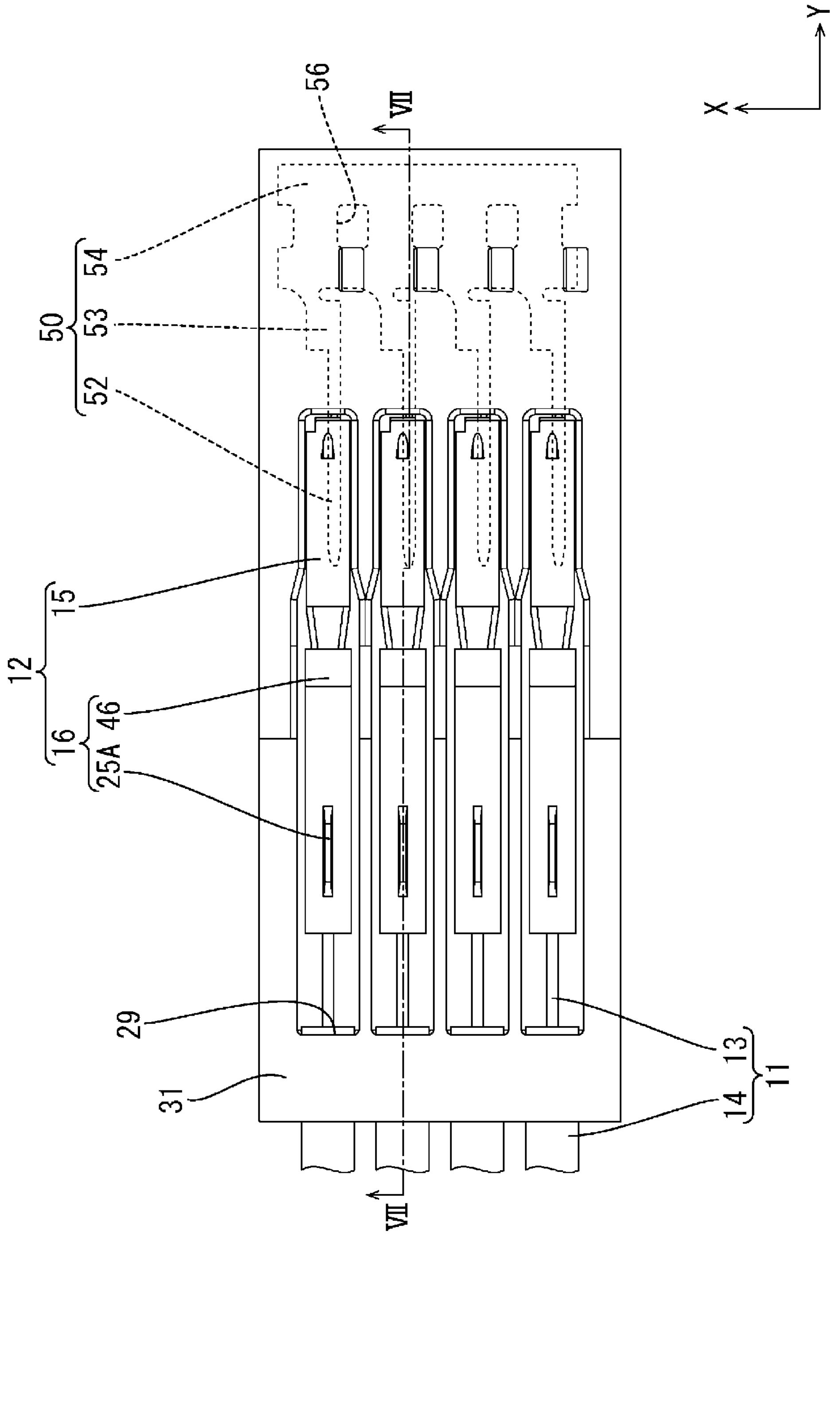
FIG. 13 is a plan view showing a state where the sliding portion is moved to a full locking position.

With the locking projection 28 of the terminal body 15 and the partial lock receiving portion 26 of the sliding portion 16 locked, the sliding portion 16 is held at a partial locking position with respect to the terminal body 15 (see FIG. 12). In this state, the upper and lower pressurizing portions 25A, 25B of the sliding portion 16 are separated rearward from the rear end edges of the upper and lower sandwiching portions 18A, 18B of the terminal body 15. Further, in this state, an interval between the upper and lower sandwiching portions 18A, 18B is set to be larger than a diameter of the core 13.

A state where the locking projection 28 of the terminal body 15 and the full lock receiving portion 27 of the sliding portion 16 are locked is a state where the sliding portion 16 is locked at a full locking position with respect to the terminal body 15. As shown in FIG. 1, in this state, the upper pressurizing portion 25A of the sliding portion 16 is in contact with the upper sandwiching portion 18A from above the upper sandwiching portion 18A. Further, the lower pressurizing portion 25B of the sliding portion 16 is in contact with the lower sandwiching portion 18B from below the lower sandwiching portion 18B.

As described above, the sliding portion 16 is slidable between the partial locking position and the full locking position while being externally fit to the region of the terminal body 15 where the upper and lower sandwiching portions 18A, 18B are provided.

As shown in FIG. 1, with the sliding portion 16 held at the full locking position with respect to the terminal body 15, the upper pressurizing portion 25A presses the upper sandwiching portion 18A from above, whereby the upper sandwiching portion 18A is deformed downward. Further, the lower pressurizing portion 25B presses the lower sandwiching portion 18B from below, whereby the lower sandwiching portion 18B is deformed upward. In this way, with the core 13 disposed to extend in the front-rear direction (extending direction) in a space between the upper and lower sandwiching portions 18A and 18B and the sliding portion 16 held at the full locking position with respect to the terminal body 15, the core 13 is sandwiched in the vertical direction by the resiliently deformed upper and lower sandwiching portions 18A, 18B. That is, the upper sandwiching portion 18A is pressed downward by the upper pressurizing portion 25A, thereby contacting the core 13 from above, and the lower sandwiching portion 18B is pressed upward by the lower pressurizing portion 25B, thereby contacting the core 13 from below.

As shown in FIG. 1, with the sliding portion 16 held at the full locking position with respect to the terminal body 15, the upper holding protrusion 23A of the upper sandwiching portion 18A presses the core 13 from above and the lower holding protrusion 23B of the lower sandwiching portion 18B presses the core 13 from below. In this way, the core 13 is pressed from above by the upper holding protrusion 23A and pressed from below by the lower holding protrusion 23B disposed at the position shifted from the upper holding protrusion 23A in the front-rear direction, thereby being held in a state bent in the vertical direction (an example of a direction intersecting the extending direction). The core 13 and the terminal 12 are electrically connected also by the upper and lower holding protrusions 23A, 23B.

Figure 7:
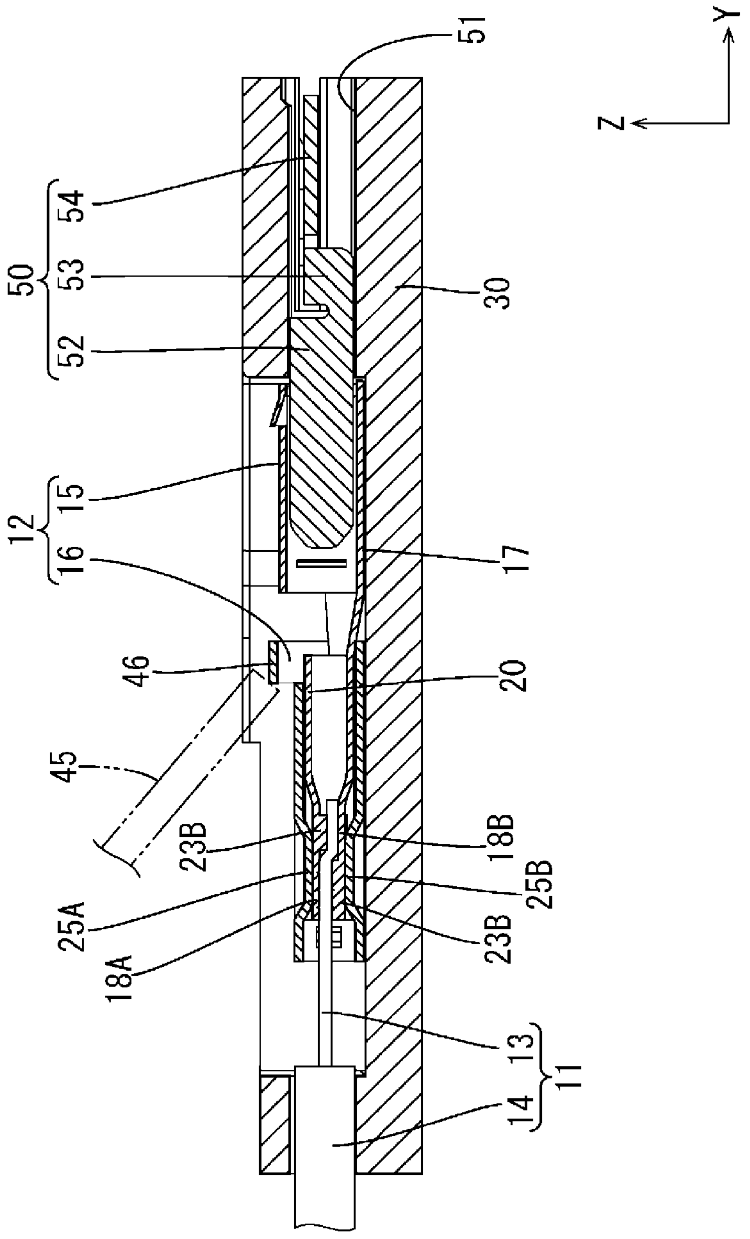
FIG. 7 is a section showing a state where the sliding portion is moved to a full locking position by a jig.

As shown in FIG. 7, a jig contact portion 46 projecting upward from the upper wall is provided on a front end part of the sliding portion 16. By bringing a jig 45 into contact with the jig contact portion 46 from behind and pressing the sliding portion 16 forward by this jig 45, the sliding portion 16 is movable forward. Note that the jig 45 is relatively smaller in size than a mold and a facility for operating this mold. Thus, a cost increase due to the jig 45 is suppressed.

As shown in FIG. 6, a pair of guiding portions 47 projecting inwardly of the sliding portion 16 are provided at positions near a rear end part of the sliding portion 16 on both left and right side walls. The guiding portions 47 are formed to become narrower from a rear side toward a front side. The core 13 is guided into the sliding portion 16 by the sliding contact of the core 13 with the inner surfaces of the guiding portions 47.

[Assembling Process of Joint Connector 10]

Next, an example of an assembling process of the joint connector 10 according to this embodiment is described. The assembling process of the joint connector 10 is not limited to the one described below.

The terminal body 15 and the sliding portion 16 are formed by a known method. The sliding portion 16 is assembled with the terminal body 15 from behind. The front end edge of the sliding portion 16 comes into contact with the locking projection 28 of the terminal body 15 from behind, thereby expanding and deforming the side wall of the sliding portion 16. If the sliding portion 16 is further pushed, the side wall of the sliding portion 16 is restored and the partial lock receiving portion 26 of the sliding portion 16 is locked to the locking projection 28 of the terminal body 15. In this way, the sliding portion 16 is held at the partial locking position with respect to the terminal body 15 (see FIG. 5). In this way, the terminal 12 is obtained.

By injection-molding the synthetic resin, the lower housing 30 and the upper cover 60 are formed.

Figure 8:
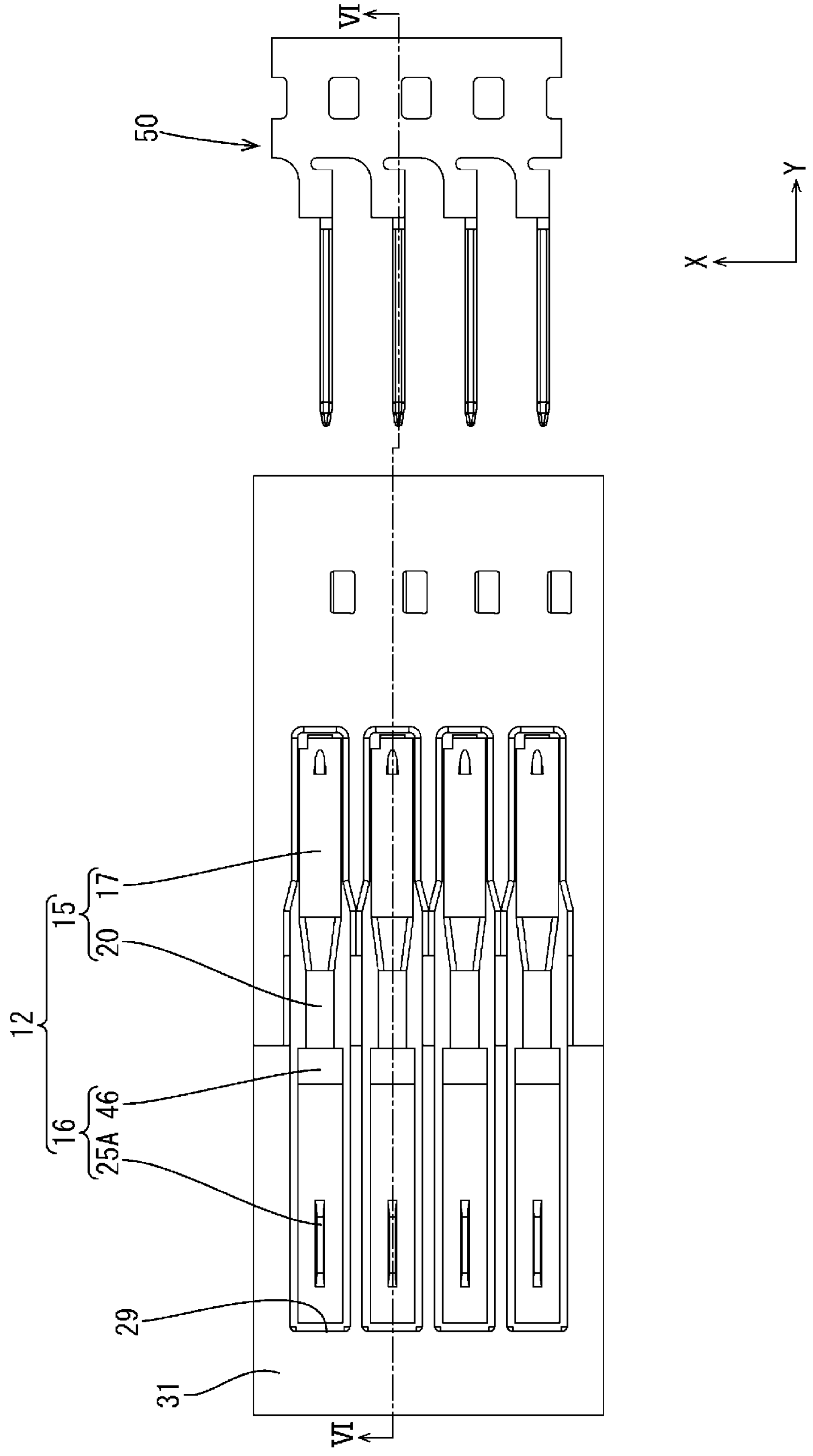
FIG. 8 is a plan view showing a state where the terminals are accommodated in the lower housing.

As shown in FIG. 8, the terminal 12 having the sliding portion 16 held at the partial locking position with respect to the terminal body 15 is inserted into the cavity 29 of the lower housing 30 from above. A rear end part of the sliding portion 16 is located in front of the rear wall 31 of the lower housing 30, and a front end part of the terminal holding portion 17 of the terminal body 15 is located behind the front wall of the lower housing 30. In this way, the terminal 12 is held in the cavity 29 while being positioned in the front-rear direction.

Figure 9:
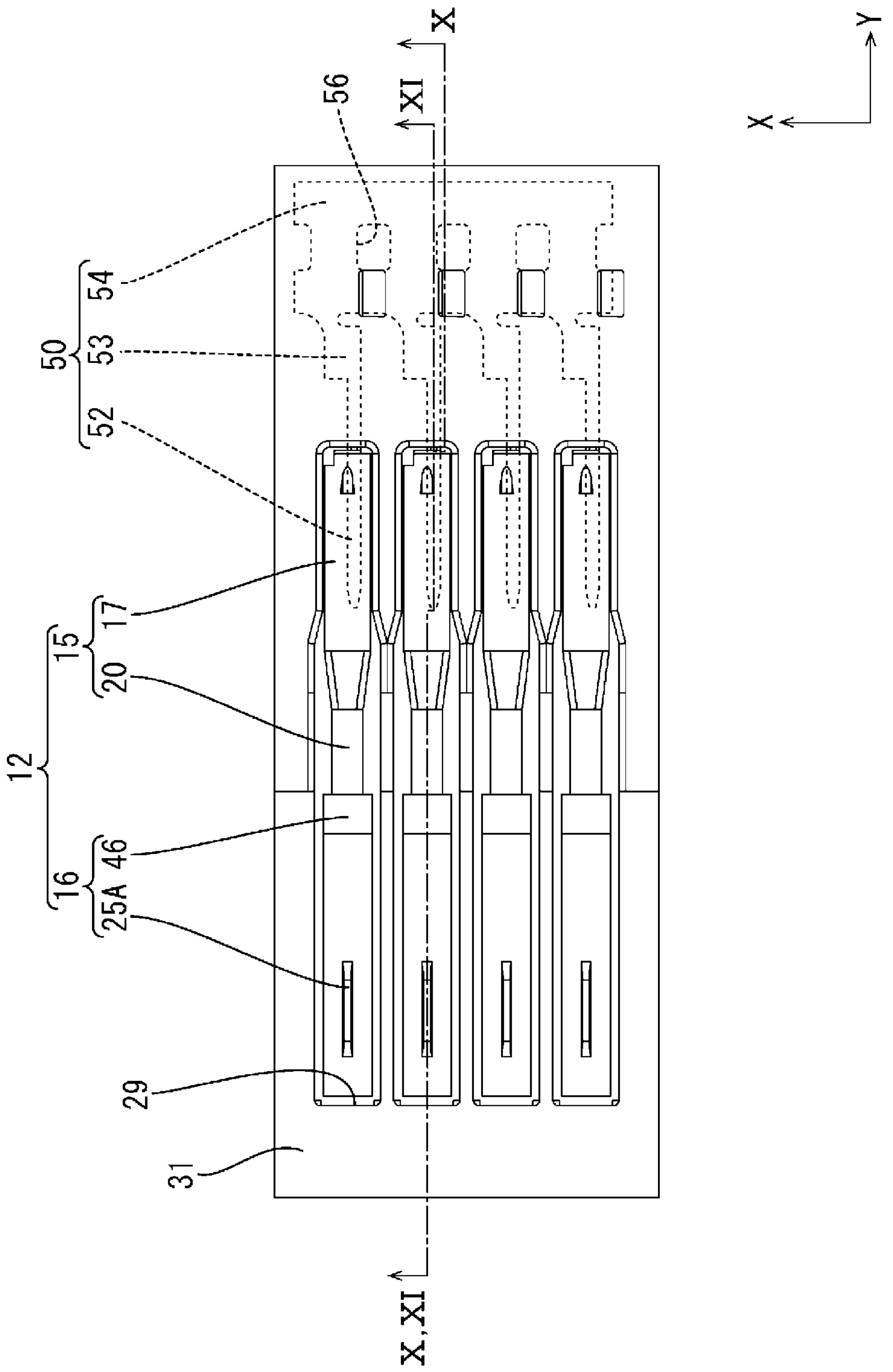
FIG. 9 is a plan view showing a state where the busbar is inserted in the lower housing.

As shown in FIG. 9, the busbar 50 is inserted into the busbar insertion holes 51 of the lower housing 30 from front. By inserting the locking claws 35 of the lower housing 30 into the locking holes 56 of the busbar 50, the busbar 50 is retained and held in the lower housing 30 (see FIG. 10). The tabs 52 of the busbar 50 are inserted into the tube portions 17 of the terminals 12. By the contact of the tabs 52 and the resilient contact piece 19, the tabs 52 and the terminals 12 are electrically connected. In this way, the plurality of terminals 12 are electrically connected via the busbar 50.

Figure 11:
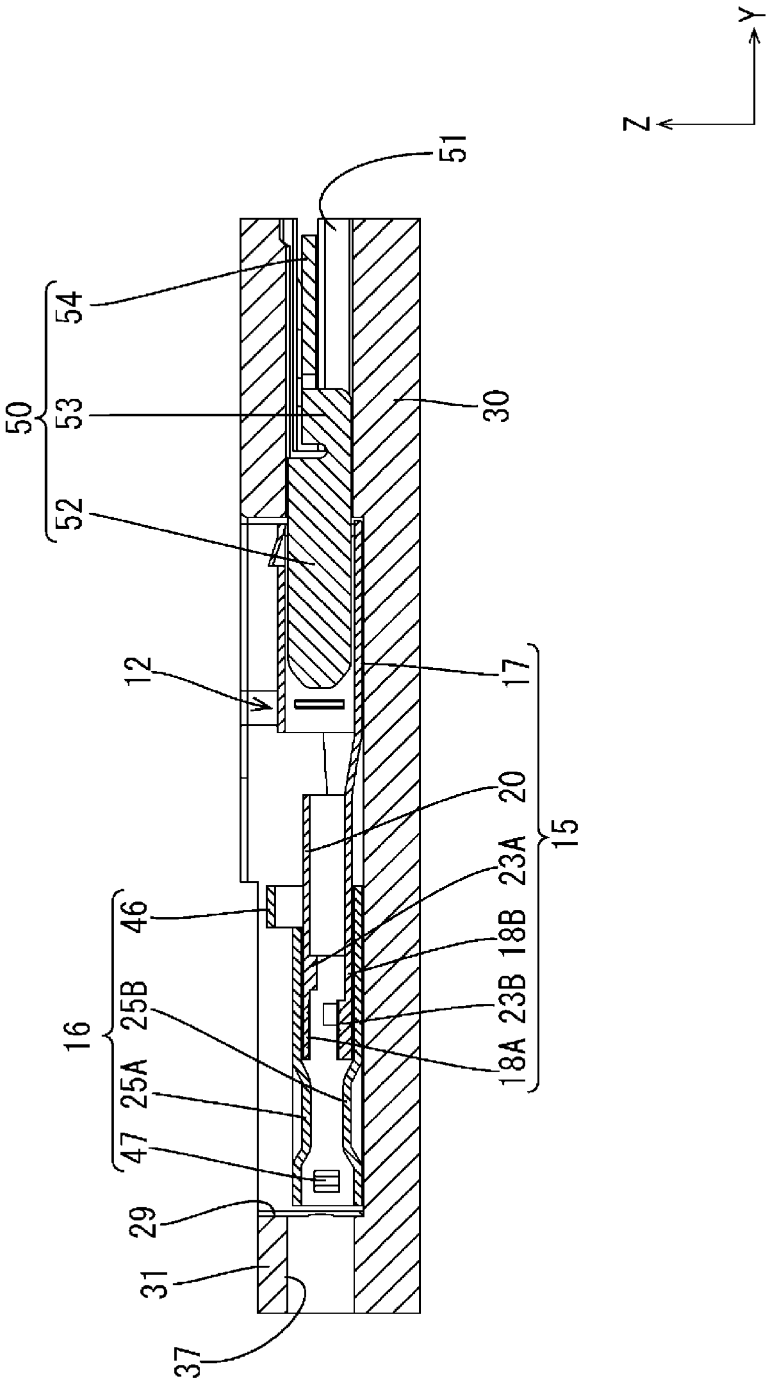
FIG. 11 is a section along XI-XI in FIG. 9.

As shown in FIG. 11, the tab 52 inserted into the terminal holding portion 17 contacts the inner wall of the terminal holding portion 17, whereby the terminal 12 is retained and held in the cavity 29 not to come out upward.

The core 13 of the wire 11 is exposed by stripping the insulation coating 14 by a known method. As shown in FIG. 12, the front end part of the core 13 is inserted from behind into the wire insertion hole 37 provided in the rear wall 31.

If the wire 11 is further pushed forward, the front end part of the core 13 is introduced into the sliding portion 16 from the rear end part of the sliding portion 16. The core 13 is guided into the sliding portion 16 by coming into contact with the guiding portions 47 of the sliding portion 16. If the wire 11 is further pushed forward, the front end part of the core 13 enters the terminal body 15 and reaches the space between the upper and lower sandwiching portions 18A, 18B.

As shown in FIG. 12, with the sliding portion 16 held at the partial locking position with respect to the terminal body 15, the interval between the upper and lower sandwiching portions 18A, 18B is set to be larger than an outer diameter of the core 13.

Subsequently, as shown in FIG. 7, the jig 45 is brought into contact with the jig contact portion 46 from behind and the sliding portion 16 is slid forward. The sliding portion 16 is moved relatively forward with respect to the terminal body 15. At this time, locking between the locking projection 28 of the terminal body 15 and the partial lock receiving portion 26 of the sliding portion 16 is released and the side wall of the sliding portion 16 rides on the locking projection 28 to be expanded and deformed.

When the sliding portion 16 is moved forward, the side wall of the sliding portion 16 is restored and the locking projection 28 of the terminal body 15 and the full lock receiving portion 27 of the sliding portion 16 are resiliently locked. In this way, the sliding portion 16 is held at the full locking position with respect to the terminal body 15.

With the sliding portion 16 held at the full locking position with respect to the terminal body 15, the upper pressurizing portion 25A of the sliding portion 16 comes into contact with the upper sandwiching portion 18A of the terminal body 15 from above to press the upper sandwiching portion 18A downward. Further, the lower pressurizing portion 25B of the sliding portion 16 comes into contact with the lower sandwiching portion 18B of the terminal body 15 from below to press the lower sandwiching portion 18A upward. In this way, the core 13 is sandwiched from upper and lower sides by the upper and lower sandwiching portions 18A, 18B (see FIG. 12).

As shown in FIG. 7, the core 13 is sandwiched by the lower surface of the upper sandwiching portion 18A and the upper surface of the lower sandwiching portion 18B, whereby the oxide film formed on the surface of the core 13 is peeled off to expose the metal surface constituting the core 13. By the contact of this metal surface and the upper and lower sandwiching portions 18A, 18B, the wire 11 and the terminal 12 are electrically connected. In this way, the plurality of wires 11 are electrically connected via the terminals 12 and the busbar 50 (see FIG. 13).

With the core 13 sandwiched from upper and lower sides by the upper and lower sandwiching portions 18A, 18B, the core 13 extends in the front-rear direction and is held in the state bent in the vertical direction by being sandwiched by the upper holding protrusion 23A of the upper sandwiching portion 18A and the lower holding protrusion 23B of the lower sandwiching portion 18B. Since the core 13 can be firmly held in this way, a holding force of the wire 11 and the terminal 12 can be enhanced when a pulling force is applied to the wire 11.

As shown in FIG. 1, the upper cover 60 is assembled with the lower housing 30 from above the lower housing 30. With the lower housing 30 and the upper cover 60 assembled, front end parts of the front terminal holding portions 63F of the upper cover 60 are located behind the jig contact portions 46 of the sliding portions 16. By the contact of the front end parts of the front terminal holding portions 63F with the sliding portions 16 from behind, rearward movements of the sliding portions 16 are suppressed.

With the lower housing 30 and the upper cover 60 assembled, the front terminal holding portions 63F are locked to cover the sliding portions 16 from above. In this way, the terminals 12 are retained and held in the cavities 29 not to come out upward.

With the lower housing 30 and the upper cover 60 assembled, the rear terminal holding portions 63R are located behind the sliding portions 16. By the contact of the rear terminal holding portions 63R with the sliding portions 16 from behind, the terminals 12 are retained and held in the cavities 29 not to come out rearward. In this way, the joint connector 10 is completed.

Functions and Effects of Embodiment

Next, functions and effects of this embodiment are described. The joint connector 10 according to this embodiment is the joint connector 10 for connecting the plurality of wires 11 and includes the lower housing 30, the upper cover 60 assembled with the lower housing 30, the plurality of terminals 12 respectively connected to the front end parts in the extending direction of the plurality of wires 11 and the busbar 50 connected to the plurality of terminals 12. The busbar 50 disposed in the lower housing 30 includes the plurality of tabs 52. Each of the plurality of terminals 12 disposed in the lower housing 30 includes the tube portion 17, each of the plurality of tabs 52 being inserted into the tube portion 17, the upper and lower sandwiching portions 18A, 18B extending along the extending direction and configured to sandwich one of the plurality of wires 11, and the sliding portion 16 disposed outside the upper and lower sandwiching portions 18A, 18B, movable along the front-rear direction and including the upper and lower pressurizing portions 25A, 25B for pressurizing the upper and lower sandwiching portions 18A, 18B toward the wire 11 with the one of the plurality of wires 11 sandwiched by the upper and lower sandwiching portions 18A, 18B. The terminal holding portions 63 projecting downward from the upper cover 60 are engaged with the terminals 12.

According to this embodiment, the core 13 of the wire 11 and the terminal 12 can be electrically connected without using a relatively large-scale jig by pushing the sliding portion 16 forward with the relatively small jig 45. In this way, the manufacturing cost of the joint connector 10 can be reduced.

Further, by applying the terminals 12 according to this embodiment to the joint connector 10, the manufacturing cost of the joint connector 10 can be reduced.

According to this embodiment, the terminals 12 can be retained and held in the lower housing 30 not to come out upward by inserting the busbar 50 into the tube portions 17. Since a structure for retaining and holding the terminals 12 becomes unnecessary in this way, the structure of the joint connector 10 can be simplified. As a result, the manufacturing cost of the joint connector 10 can be reduced.

The sliding portion 16 is movable with respect to the upper and lower sandwiching portions 18A, 18B between the partial locking position where the upper and lower pressurizing portions 25A, 25B are separated from the upper and lower sandwiching portions 18A, 18B and the full locking position where the upper and lower pressurizing portions 25A, 25B press the upper and lower sandwiching portions 18A, 18B toward the wire 11, and the terminal holding portion 63 is locked to the sliding portion 16 at the full locking position with respect to the upper and lower sandwiching portions 18A, 18B.

With the lower housing 30 and the upper cover 60 assembled, the front terminal holding portions 63F are locked to cover the sliding portions 16 from above. In this way, the terminals 12 are retained and held in the cavities 29 not to come out upward.

With the lower housing 30 and the upper cover 60 assembled, the rear terminal holding portions 63R are located behind the sliding portions 16. By locking the rear terminal holding portions 63R to the sliding portions 16 from behind, the terminals 12 are retained and held in the cavities 29 not to come out rearward.

By assembling the upper cover 60 with the lower housing 30, the terminal holding portions 63 (front and rear terminal holding portions 63F, 63R) provided on the upper cover 60 as described above are locked to the sliding portions 16 as described above. Thus, it can be confirmed that the sliding portions 16 have moved to the full locking position.

According to this embodiment, the lower housing 30 includes the rear wall 31 located behind the plurality of terminals 12 in the extending direction, the rear wall 31 includes the plurality of wire insertion holes 37 penetrating in the extending direction, the plurality of wires 11 being respectively inserted into the wire insertion holes 37, and the upper and lower sandwiching portions 18A, 18B are disposed in front of the wire insertion holes 37.

If the wire 11 is inserted from behind the wire insertion hole 37, the wire 11 enters between the upper and lower sandwiching portions 18A, 18B located in front of the wire insertion hole 37. Since the wire 11 is guided into between the upper and lower sandwiching portions 18A, 18B by the wire insertion hole 37, the manufacturing efficiency of the joint connector 10 can be improved.

According to this embodiment, the cross-sectional area of the wire insertion hole 37 orthogonal to the front-rear direction is smaller than that of the sliding portion 16 orthogonal to the front-rear direction.

Since the cross-sectional area of the wire insertion hole 37 is smaller than that of the sliding portion 16, the escape of the sliding portion 16 to the outside of the lower housing 30 through the wire insertion hole 37 is suppressed. In this way, the terminal 12 having the sliding portion 16 held at the partial locking position can be held in the lower housing 30.

Other Embodiments

The present disclosure is not limited to the above described and illustrated embodiment. For example, the following embodiments are also included in the technical scope of the technique disclosed in this specification.

(1) Two, three, five or more terminals 12 may be disposed in the lower housing 30.

(2) The upper cover 60 and the lower housing 30 may be integrated by a hinge or the like.

(3) The terminal 12 may include one, three or more sandwiching portions.

LIST OF REFERENCE NUMERALS

10: joint connector
11: wire
12: terminal
13: core
14: insulation coating
15: terminal body
16: sliding portion
17: tube portion
18A: upper sandwiching portion
18B: lower sandwiching portion
19: resilient contact piece
20: wire connecting portion
23A: upper holding protrusion
23B: lower holding protrusion
25A: upper pressurizing portion
25B: lower pressurizing portion
26: partial lock receiving portion
27: full lock receiving portion
28: locking projection
29: cavity
30: lower housing
31: rear wall
35: locking claw
36: rear wall
37: wire insertion hole
39: insertion hole
45: jig
46: jig contact portion
47: guiding portion
50: busbar
51: busbar insertion hole
52: tab
53: relay portion
54: coupling portion
56: locking hole
60: upper cover
61: upper wall
62: side wall
63: terminal holding portion
63F: front terminal holding portion
63R: rear terminal holding portion
64: groove

What is claimed is:

1. A joint connector for connecting a plurality of wires, comprising:
a lower housing;
an upper cover assembled with the lower housing;
a plurality of terminals respectively connected to front end parts in an extending direction of the plurality of wires; and
a busbar connected to the plurality of terminals,
wherein:
the busbar disposed in the lower housing includes a plurality of tabs,
each of the plurality of terminals disposed in the lower housing includes a tube portion, each of the plurality of tabs being inserted into the tube portion, a sandwiching portion extending along the extending direction and configured to sandwich one of the plurality of wires, and a sliding portion disposed outside the sandwiching portion, movable along the extending direction and including a pressurizing portion configured to pressurize the sandwiching portion toward the wire with the one of the plurality of wires sandwiched by the sandwiching portion, and
a terminal holding portion projecting downward from the upper cover is engaged with the terminals.

2. The joint connector of claim 1, wherein:
the sliding portion is movable with respect to the sandwiching portion between a partial locking position where the pressurizing portion is separated from the sandwiching portion and a full locking position where the pressurizing portion presses the sandwiching portion toward the plurality of wires, and
the terminal holding portion is engaged with the sliding portions located at the full locking position with respect to the sandwiching portions.

3. The joint connector of claim 1, wherein:

the lower housing includes a rear wall located behind the plurality of terminals in the extending direction, and the rear wall includes a plurality of wire insertion holes penetrating in the extending direction, the plurality of wires being respectively inserted through the wire insertion holes, and the sandwiching portions are disposed in front of the wire insertion holes in the extending direction.

4. The joint connector of claim 3, wherein a cross-sectional area of the wire insertion hole orthogonal to the extending direction is smaller than that of the sliding portion orthogonal to the extending direction.

* * * * *